July 18, 1950            F. KORN            2,515,879
AUTOMATIC PRESSURE COOKER
Filed Nov. 27, 1945            3 Sheets-Sheet 1
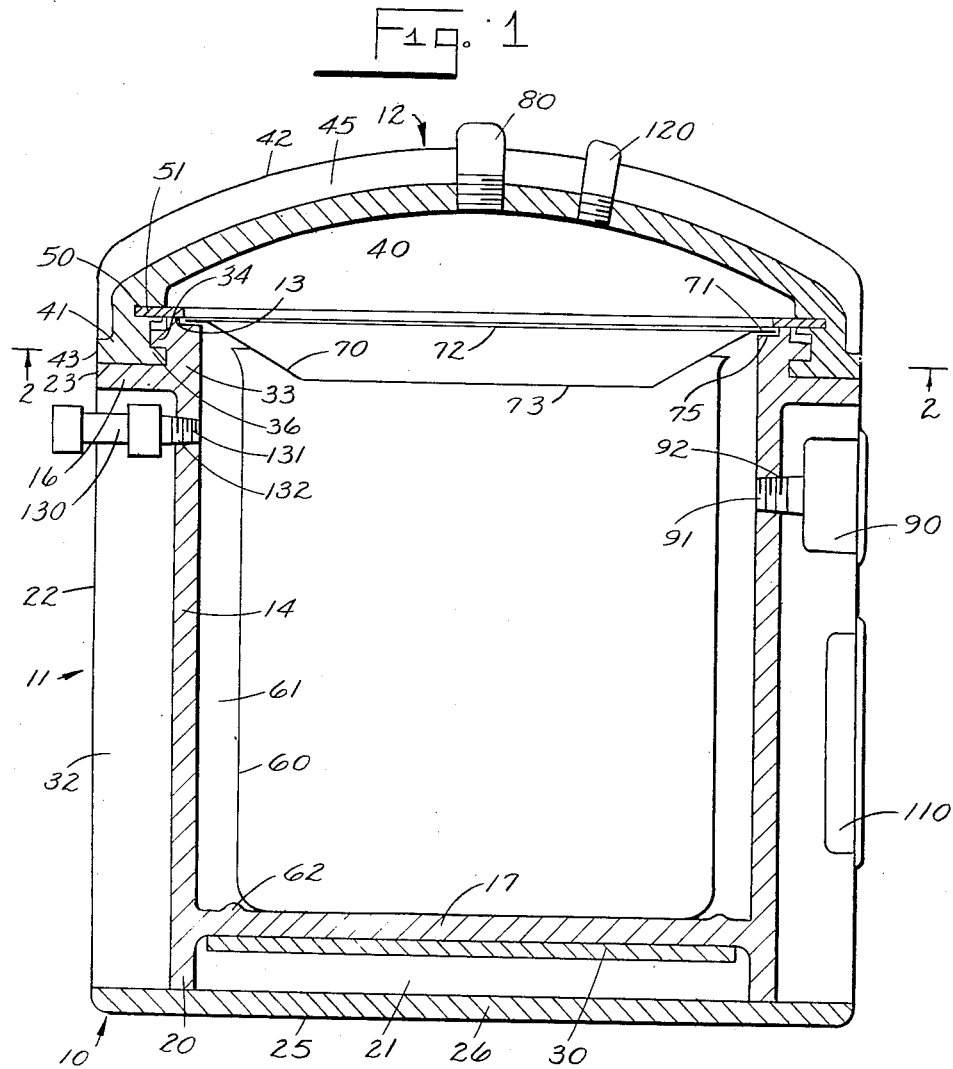
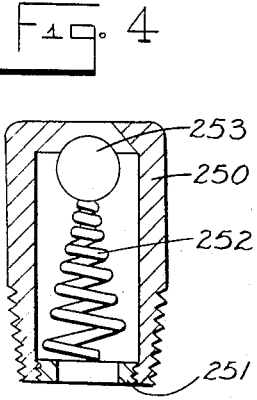
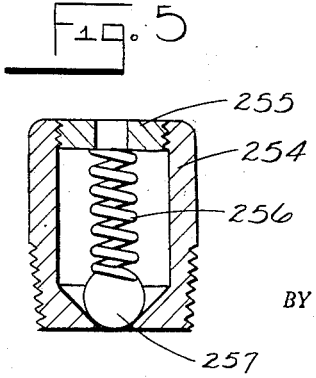
INVENTOR.
FREDERICK KORN
BY
Ostrolenk & Faber
ATTORNEYS

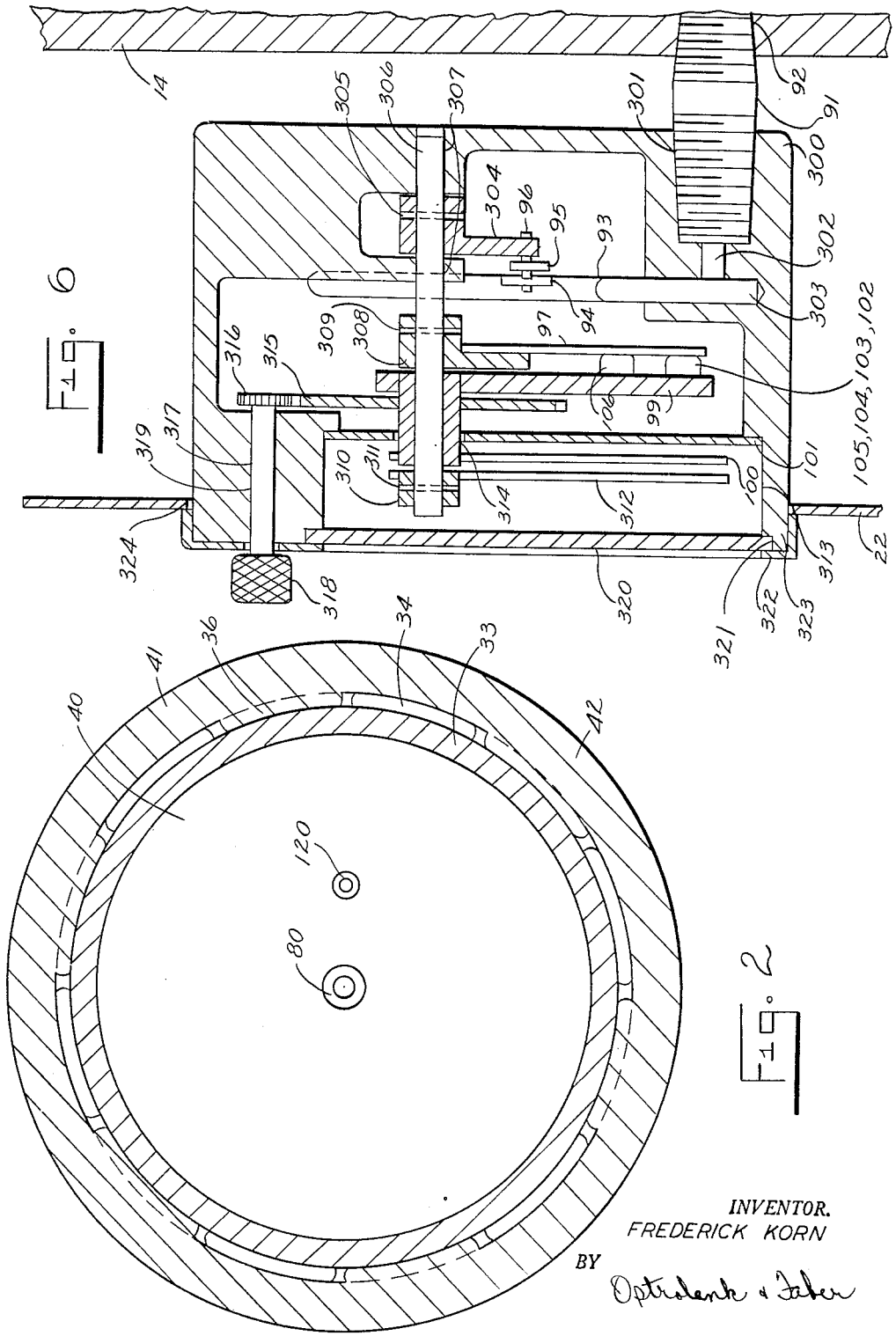

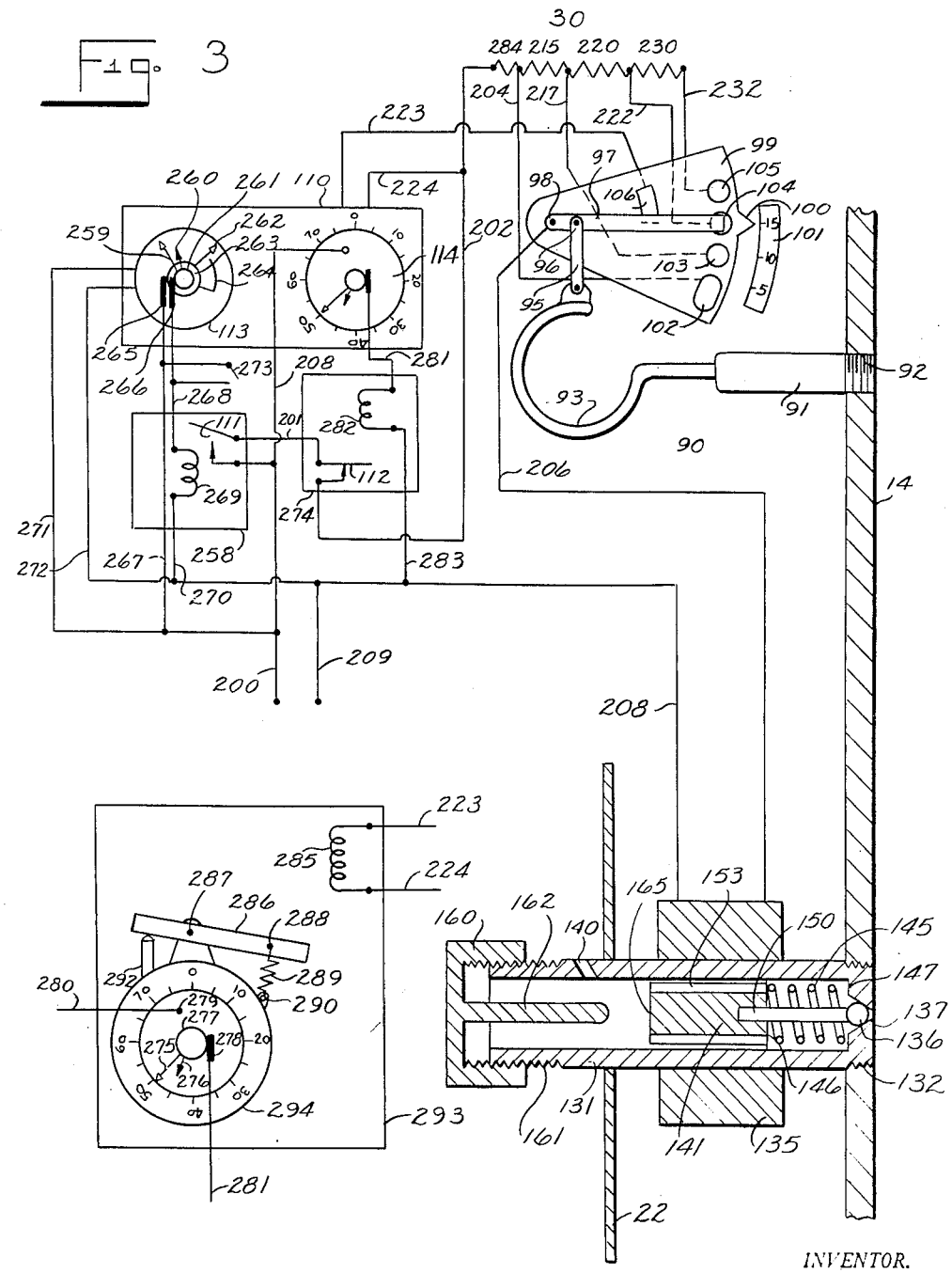

Patented July 18, 1950

2,515,879

UNITED STATES PATENT OFFICE 2,515,879

AUTOMATIC PRESSURE COOKER

Frederick Korn, Freeport, N. Y.

Application November 27, 1945, Serial No. 631,164

9 Claims. (Cl. 219—43)

My present invention relates to pressure cookers, and particularly to a pressure cooker designed and constructed to be entirely automatic in its operation.

Also, my invention relates to the pressure cooker which is simplified in construction, requires no mechanical skill or dexterity on the part of the housewife to operate, and which nevertheless is so constructed that all of the advantages of a pressure cooker are obtained in addition to other advantages not previously available in the prior art.

My invention contemplates a pressure cooker having a heating element associated therewith and so arranged that heat transfer from the heating element to the pressure cooker is direct and immediate.

My invention also contemplates the arrangement of a pressure cooker so that a removable interior container is associated therewith, thus obviating the necessity for cleaning the entire pressure cooker after each cooking operation. Since most pressure cookers are necessarily, by reason of the fact that they must resist internal pressure, relatively heavy or massive structures, it has always been a rather difficult task to clean. The utilization of the insert container for the food which is to be cooked obviates this.

My invention also contemplates the utilization of a removable drip ring in connection with the insert container to insure that steam which is condensed by the cover is returned to the insert container and not to the area between the insert container and the outer wall of the pressure cooker.

Also, my invention contemplates a novel electro-mechanical system responsive to various conditions within the pressure cooker to control the various operations of the pressure cooker in accordance with predetermined settings of various elements thereof.

Accordingly, a primary object of my invention is the provision of a novel pressure cooker having a heating element integrally associated therewith.

Another object of my invention is the provision of a novel pressure cooker having an insert container associated therewith to obviate the necessity for cleaning the entire pressure cooker after each cooking operation.

A further object of my invention is the provision of a novel drip ring associated with the insert container in order to return steam condensed by the cover to the interior of the insert container.

Another object of my invention is the provision of a novel electro-mechanical control system associated with various elements of the pressure cooker for controlling each of the operations of the pressure cooker in accordance with predetermined settings of various elements thereof.

The foregoing and many other objects of my invention will become apparent in the following description and drawings in which:

Figure 1 is a cross-section through my novel pressure cooker showing the various elements thereof.

Figure 2 is a view taken along line 2—2 of Figure 1 looking in the direction of the arrows.

Figure 3 is a schematic view showing my novel electro-mechanical system for controlling the various operations of my pressure cooker in accordance with predetermined settings of various elements thereof.

Figure 4 is a cross-sectioned view of the exhaust valve used in the cooker.

Figure 5 is a cross-sectioned view of the safety valve also used in the cooker.

Figure 6 is a cross-sectioned view of the pressure gauge shown schematically in Figure 3.

Referring first to Figure 1, I have here shown my novel pressure cooker 10 as comprising a principal container or housing 11 and a cover member 12. The principal container or housing has an interior cylindrical wall 14 defining the interior of the pressure cooker. Cylindrical wall 14 is provided adjacent its upper end with an annular flange 16 to provide a rest for the cover 12 in the manner hereinafter described.

The cylindrical interior wall 14 also has integrally secured thereto a bottom wall 17—the bottom wall 17 and cylindrical wall 14 forming a container open at the top. Wall 14 is extended below the bottom wall 17 at the annular flange 20 to form a circular recess 21 between the bottom wall 17 and the base on which the flange 20 rests.

The lower container 11 also has an outer cylindrical wall 22 which is secured by welding, brazing or otherwise at 23 to the outer edge of the upper annular flange 16. The outer casing or container section 22 has a bottom wall 25 preferably integral therewith.

An asbestos plate 26 is secured to the upper surface of the bottom wall 25 in any suitable manner and the annular flange 20 of the inner container 14—17 rests thereon, the recess 21 being entirely enclosed by the bottom wall 17 of inner container 14, the bottom wall 25, the outer casing 22, and the asbestos sheet 26, as well as by the annular flange 20.

An electrical heating element 30 preferably of a high power quick-heating type is secured in any suitable manner in contact with the underside of the bottom wall 17 of the inner wall 14, so that a heat transfer between the heating element 30 and the bottom wall 17 can readily occur. The heat element 30 is, however, insulated from the bottom wall 25 of the outer casing by the recess 21 and the asbestos plate 26.

The outer casing 22 and the inner wall 14 are insulated from each other by the space 32, which space may, however, be evacuated or preferably is filled with a suitable fibrous insulation material.

The inner wall 14 is extended at 33 above its annular flange 16 to form a plurality of breech-block elements 34 spaced upwardly from the flange 16 by sufficient distance to readily receive the matching breech-block elements 36 of the cover 12.

The cover 12 has an inner wall 40 somewhat dome-shaped in form, as shown in Figure 1, and terminating in the annular flange 41 which carries the breech-block elements 36. The cover 12 also has an outer casing 42 connected at 43 to the outer edge of the annular flange 41 and spaced from the inner wall 40.

The space 45 between inner wall 40 and outer casing 42 of the cover 12 may be evacuated for insulation purposes or preferably is filled with a suitable fibrous insulating material. The cover 12 is provided with a handle or other suitable means for readily rotating the same in order to engage or disengage the breech-block elements 34 and 36.

Preferably the inner wall 40 of the cover and its associated flange 41 and breech-block elements 36 as well as the inner wall 14 of the lower container together with its associated elements including bottom wall 17 and flanges 20 and 16 are of cast metal. The outer casings 22 and 42 are preferably of sheet metal.

The inner wall 40 of the cover 12 is provided with an annular recess 50 above the breech-block elements 36 at such a height as to match the upper end 13 of the container wall 14; a gasket 51 is secured in any suitable manner in the recess 50. Internal pressure within the container would drive the gasket 51 into sealing engagement against the upper end 13 of the inner wall 14.

My novel pressure cooker is provided with an insert container 60 open at the top and closed at the bottom, the insert container 60 resting on the bottom wall 17 of the interior of the pressure cooker and thus being in efficient heat transfer contact with the bottom wall 17 so that heat from the heating element 30 may readily be transferred thereto.

Suitable means may be provided if desired on the bottom wall 17 to space the insert container 60 from the inner wall 14, such means including preferably an annular ridge 62 in the upper surface of the bottom wall 17. For ordinary cooking operations, the water necessary to generate the steam is placed only in the insert container 60 and the food to be cooked in the pressure cooker is also placed in the insert container 60. The insert container 60 is then inserted in the interior of the pressure cooker to rest on the bottom wall 17 and the cover is secured in place.

Steam which is generated and which comes into contact with the bottom surface of the cover 40 will to some extent condense and flow back into the pressure cooker. Thus, part of the steam will flow back into the space 61 and into contact with the wall 14 and bottom wall 17 of the pressure cooker unless means are provided to prevent such occurrence.

In order, therefore, to guide all of the condensed moisture back into the insert container 60 and thus to prevent moistening of the inner wall 14 of the principal pressure cooker itself and the consequent necessity for cleaning the same, I have provided a novel drip ring 70 having an annular flange 71 and a general funnel-shaped cross-section; the wall of the drip ring 70 is partly conical in form, the upper opening 72 of the drip ring being much wider than the lower opening 73 thereof.

As will be seen, the annular flange 71 of the drip ring 70 rests on the annular ledge 75 provided at the upper end of the inner wall 14 while the drip ring 70 extends into the insert container 60 and the narrower opening 73 communicates with the insert container 60.

Any moisture resulting from condensation of steam by the cover will thus be guided back to the interior of the insert container 60 and the principal wall of the pressure cooker will not be soiled thereby.

In actually placing the food into the pressure cooker, the cover is of course first removed, the insert container 60 is placed with the appropriate water and food into the interior of the pressure cooker, the drip ring 70 is then placed in position as shown, and the cover 12 is then secured in position.

In order to remove the food, the cover 12 is removed and the drip ring 70 is taken out. The food may then be removed from the insert container 60 or the insert container 60 may be removed as a whole.

Thus it will be seen that for most purposes, only the insert container 60 need be washed after each cooking. It will also be seen that the drip ring 70 acts as a baster returning the condensed moisture from the cover back to the food in the insert container 60.

When it is desired to steam food, water is placed in the main body of the pressure cooker itself. A suitable wire grid or rack, not shown, is placed on the bottom wall 17 of the main cooker body and the insert container 60 is placed on the rack. The drip ring 70 is in this case not used and steam condensed by the cover 12 flows down the dome-shaped interior of the cover 12 to the annular ledge 75 and down the side wall 14 to be re-vaporized into steam once more. By this means, my novel cooker may be used for combined cooking and steaming of food.

My pressure cooker shown in Figure 1 is provided with various controls, the function of which is hereinafter described in connection with Figure 3. The heating element 30 has already been referred to and is connected by suitable means to the other elements hereinafter described in connection with Figure 3.

The cover 12 is provided with an exhaust valve 80 so arranged as to permit the passage of air therethrough from the interior of the pressure cooker to the exterior. The exhaust valve 80 is so arranged that passage of steam closes it either by thermostatic action or by the pressure of the steam. Preferably, the internal steam pressure is used to close the valve.

Figure 4 shows a vertical cross-section through exhaust valve 80. The lower outside portion of valve body 250 is threaded and screws into inner wall 40 of cover 12. The lower inside portion of valve body 250 is threaded to accommodate retainer 251 which serves to keep thermostatic conical spiral 252 in place inside valve body 250. Thermostat 252 is of bi-metallic construction and is so arranged as to expand with rise in temperature. The upper end of thermostat 252 holds the stem of ball valve 253. Normally, valve 80 is open as shown in Figure 4. Passage of steam through valve 80 closes the valve by expanding thermostat 252, seating ball valve 253 against the conical valve seat which forms the upper inside portion of valve body 250.

Thus, when the food in the pressure cooker is first heated, air is driven off through the exhaust valve 80. As the interior begins to fill with steam, air above the steam is driven off more rapidly. When the interior is sufficiently filled with steam to eject steam through the exhaust valve 80, it closes and the pressure cooker begins to operate in the well known manner as a pressure cooker.

My novel pressure cooker is also provided with a pressure gauge 90 connected by the threaded tube 91, threaded into the threaded opening 92 of the wall 14 to the interior of the pressure cooker. The outer casing 22 has a suitable opening for the face of pressure gauge 90.

My novel pressure cooker is also provided with a timing clock 110 mounted in any suitable manner in the outer casing 22 of the pressure cooker. As hereafter described in connection with Figure 3, it may be set to close a circuit to the heating element 30 at any time desired after the initial clock setting.

It is also arranged so that it is set to time the cooking operation when the desired pressure is reached in the pressure cooker. When the desired cooking time, measured from the time pressure is obtained in the pressure cooker, has ended, the timing clock 110 will automatically switch off current to the heating element 30.

My novel pressure cooker is also provided with a safety valve 120 secured in the cover 12 in any suitable manner and arranged to release pressure in the cooker in the event of the failure of automatic pressure control.

Figure 5 shows a vertical cross-section of safety valve 120. The lower outside portion of valve body 254 is threaded and screws into inner wall 40 of cover 12. The upper inside portion of valve body 254 is threaded to accommodate retainer 255 which serves to keep compression spring 256 in place inside valve body 254. Normally, spring 256 holds ball valve 257 seated against the conical valve seat which forms the lower inside portion of valve body 254. However, excessive pressure developed inside the cooker will overcome the pressure of spring 256 and will lift ball valve 257 away from its seat. This will open the valve 120 and allow steam to escape till a safe pressure is again attained inside the cooker.

My novel pressure cooker is also provided with a pressure release valve 130 connected by the threaded tube 131 in the threaded opening 132 of the wall 14 to the interior of the pressure cooker. As hereinafter described in connection with Figure 3, the pressure release valve 130 can be set, however, to open automatically at the termination of the cooking period or to require manual release.

Referring now to Figure 3, I have here shown schematically the automatic features of my novel pressure cooker. In the first place, it should be seen that the pressure gauge 90 is essentially a Bourdon tube 93 which tends to straighten out in accordance with the internal pressure therein.

The outer end 94 of the Bourdon tube 93 is connected to the link 95 which is in turn connected at 96 to the contact arm 97, contact arm 97 is pivotally mounted on the pivot 98. Contact plate 99 is also pivotally mounted on the pivot 98 and is provided with a pointer 100 registering with the pressure scale 101.

Contact plate 99 is provided with a plurality of contacts 102, 103, 104, 105 and 106 which moves with the contact plate 99. The contact plate 99 is pre-set by moving the plate 99 and pointer 100 to the particular pressure desired with respect to the scale 101.

In Figure 3 the contact plate 99 of the pointer 100 has been moved to a setting for 15 pounds cooking pressure. Should the setting be made for 10 pounds cooking pressure, then the contact plate 99 and the associated contacts would be shifted clockwise to an appropriate degree—approximately 10 degrees clockwise and all of the operations would then take place at an earlier point or at lower steam pressure and at a smaller expansion of the Bourdon tube.

The timing clock 110 consists essentially of two separate clock or timing mechanisms 113 and 114. The purpose of clock 113 is to close switch 111 of relay 258 at a predetermined time. This is accomplished as follows: Slip ring 261 and contact 260, both insulated from the clock mechanism, and clock pointer 259 are all driven by the mechanism of clock 113. Slip ring 263 and contact ring 264, both insulated from the clock mechanism, and indicating pointer 262 all are rotatable as a unit and can be set at any predetermined time. When clock pointer 259 reaches this predetermined time, contact 260 touches ring 264 allowing current from line 208 to flow through lead 267, brush 265, slip ring 263, contacts 264 and 260, slip ring 261, brush 266, lead 268, coil 269 of relay 258 and lead 270 to line 209. The energizing of coil 269 closes switch 111 of relay 258. The length of contact ring 264 is large enough to permit switch 111 to remain closed for a period longer than will ever be encountered in normal use of the pressure cooker. When desired, immediate closing of switch 111 can be accomplished by manually closing switch 273. Clock 113 is electrically driven from lines 208 and 209 through leads 271 and 272. Clock 113 may also be spring driven, in which case leads 271 and 272 are dispensed with.

The purpose of clock 114 is to open normally closed switch 112 of relay 274 after a predetermined period of time. Clock 114 is electrically driven from leads 223 and 224 and as hereinafter described is set into operation when cooking pressure is reached. Slip ring 277 and contact 276, both insulated from the clock mechanism, and pointer 275 are all driven as a unit by the mechanism of clock 114. Pointer 275 is set to the desired period of time. When the clock 114 is set into operation, pointer 275 rotates counter-clockwise, indicating the amount of time remaining till switch 112 will be opened. When pointer 275 reaches zero, contact 276 reaches contact 279, allowing current from line 208 to flow through lead 280, contacts 279 and 276, slip ring 277, brush 278, lead 281, coil 282 of relay 274 and lead 283 to line 209. The energizing of coil 282 opens normally closed switch 112 of relay 274. As to be hereinafter described, clock 114 also stops at this point.

Figure 3 also shows a spring driven clock 293 which can replace electrically driven clock 114. All parts of clock 293, which are the same and perform the same functions as parts of clock 114, are numbered the same. Clock mechanism 294 is the same as any commercial spring driven "stop watch" except that it has only one hand which can be set at any place on the dial. The clock mechanism runs only when button 292 is depressed, and stops whenever button 292 is released. As hereinafter described, when the desired pressure is reached in the cooker, conductors 223 and 224 are energized, thus energizing coil 285 of clock 293. This pulls the right hand end of armature 286 upwards against the resistance of tension spring 289. Armature 286 rotates about pivot 287 and depresses button 292, thereby setting clock mechanism 294 into operation. When coil 285 is de-energized, tension spring 289, attached to armature 286 at point 288 and to clock 294 at point 290, pulls armature 286 back to its original position, thereby releasing button 292 and stopping clock mechanism 294. It is thus obvious, that clock 293, though spring driven, performs exactly the same functions as electrically driven clock 114.

The heating element 30 is in series with the normally closed switch 112 and the normally open switch 111 so that it will be brought into operation when switch 111 is closed and so that it will be turned off when switch 112 is opened.

Valve 130 is a steam pressure release valve surrounded by the solenoid coil 135. The valve is a ball valve 136 seated in the valve seat 137 and arranged so that it is normally held open by compression spring 145 so that steam within the chamber 14 may escape into the tube 131 and out through the opening 140. The solenoid armature 141 in the tube 131 is arranged so that when the coil 135 is energized, the armature 141 will be driven to the right. Armature 141 is, however, biased toward the left by compression spring 145 bearing at one end against the face 146 of armature 141 and at the opposite end against the end 147 of tube 131.

Armature 141 is provided with a stud 150 holding the ball valve 136. When the coil 135 is energized, armature 141 is pulled to the right compressing the spring 145 and driving stud 150 and ball valve 136 to seal the opening 137. When the coil 135 is de-energized, the spring 145 drives the armature 141 to the left so that the ball valve 136 may be moved out of the valve seat or opening 137 to permit steam to escape.

The armature 141 is appropriately slotted or grooved at 153 to permit the steam which is rereleased to by-pass the armature and escape through opening 140. Armature 141 and hence the valve 136 may be locked in valve closing position by the nut 160 threaded on the threaded end 161 of tube 131 and having the central stud 162.

When the nut 160 is turned in, stud 162 bears against the face 165 of armature 141 driving it to the right and thus driving its pin or stud 150 and ball valve 136 to close the same. This overcomes the action of compression spring 145 and maintains the valve structure 130 closed irrespective of energization or de-energization of the solenoid coil 135.

Thus, for automatic release of steam pressure at a predetermined time, nut 160 is maintained in its outermost or retracted position so that the valve may be opened or closed in response to deenergization or energization of the solenoid coil 135. When the nut 160 is turned in, then the valve structure 130 will remain closed whether or not solenoid coil 135 is energized or de-energized.

Tracing now the operation of the device as shown, the contact arm 97 is normally in a position where its end engages contact stud 102. Switch 111 is open and switch 112 is closed. Clock 113 is set to close the switch 111 at a predetermined time and clock 114 is set to open the switch 112 at a predetermined time. Thus, for instance, should the housewife desire to pressure cook a pound of meat for 25 minutes, starting at 11:35, she will set the point 262 of clock 113 at 11:35. Assuming that the pound of meat will take 25 minutes to cook at 15 pounds pressure, she will set the pointer 275 of clock 114 at 25 minutes. Since 15 pounds pressure is desired for the cooking operation, the pointer 100 is set opposite the 15 pound mark on scale 101. Again at the initiation of all of these operations, contact arm 97 is at the contact 102.

At 11:35 in the example above described, switch 111 is closed and a circuit is then established from line 200 to the switch 111 to the conductor 201 to the closed switch 112 through the conductor 202 to the section 284 of heating element 30; then through conductor 204 to the contact stud 102, then through contact arm 97 to the conductor 206 and through this conductor to the solenoid coil 135; then through conductor 208 to the opposite side of the circuit through line 209.

The heating element section 284 is thus energized and begins to heat the water and food within the container 60. The solenoid coil 135 of valve structure 130 is energized to attract the armature 141 to the right to drive ball valve 136 against the valve seat 137 and to close the valve structure 130 so that steam cannot escape through the valve structure 130.

Contact arm 97 is sufficiently wide at its contact end so that it will bridge adjacent contacts 102 and 103 as it passes thereacross. As the temperature rises, the water in the container 60 is vaporized into steam and the air at the top of the pressure cooker is driven off through the valve 80.

When steam begins to escape through the valve 80, the valve 80 is closed and now pressure begins to rise in the interior of the pressure cooker. This is so because valve structure 130 was closed on energization of solenoid coil 135 and valve 80 was closed on the escape of steam therethrough and there are no other valves except the safety valve 120.

As pressure rises, the end of contact arm 97 is driven by the Bourdon tube 93 along the contact stud 102 and on to the contact stud 103. This is so because, as the end 94 of the Bourdon tube 93 is driven to the left by expansion thereof in response to steam pressure, link 95 is forced up thus causing the contact arm 97 to rotate counterclockwise around its pivot 98. When the end of contact arm 97 has left the contact stud 102 and has engaged contact stud 103, resistance 215 is inserted in series with the section 284 heating coil 30. This lowers the current through the heating element 30 and reduces its heat output. The insertion of resistance 215 prevents overshooting of the desired pressure.

The circuit now is from line 200 through switch 111, conductor 201, switch 112, conductor 202, resistance 284, resistance 215, conductor 217, contact 103, contact arm 97, conductor 206, solenoid coil 135 and conductor 208 back to the opposite side of the circuit 209.

As the contact arm 97 is now moved further upwardly or counterclockwise around the pivot 98 on further expansion of the Bourdon tube 93, it leaves the contact stud 103 and engages contact stud 104. At this time resistance 220 is inserted in series with resistance 215 and resistance 284. This reduces the current through the heating element 30 to the value necessary to maintain constant pressure and at this point, it will be seen the contact arm 97 has moved into registry with the pointer 100 which has been set at the predetermined pressure.

The circuit now is again from line 200 through switches 111 and 112, resistance 284, resistance 215, resistance 220, conductor 222, contact stud 104, then through the contact arm 97, conductor 206, solenoid coil 135, conductor 208 and back to the opposite side of the circuit 209.

Also, as contact arm 97 moves into registry with pointer 100, the former engages contact 106 and a circuit is established from line 200 through switches 111 and 112, conductors 202 and 224, timing clock 114, conductor 223, contact stud 106, arm 97, conductor 206, solenoid coil 135, conductor 208, and back to the opposite line 209.

Thus, when the desired pressure is reached, the clock 114 is energized for operation and now begins to time the cooking operation. It will thus be seen that the operation of the timing device 114 is initiated only when proper cooking pressure is reached.

Also it will be seen, that should the pressure within the cooker at any time fall below that required, arm 97 will leave engagement with contact 106 and clock 114 will cease operation and will not start again until the required pressure has been re-established. However, should the pressure rise above the required value, arm 97 will maintain engagement with contact 106, and timing will not be interrupted.

At the end of the 25 minutes previously assumed, timing device 114 will open switch 112 which will de-energize heating coil 30 and will also de-energize the solenoid coil 135 in series therewith. Also, since the circuit for timing clock 114 includes switch 112, the clock will stop rotation when the latter switch is opened.

Should the heat and, therefore, the pressure continue to rise beyond the pre-set pressure (15 pounds in the example shown) then the contact arm 97 is moved upwardly by further expansion of the Bourdon tube 93 into engagement with contact stud 105. This inserts additional resistance 230 in series with resistances 220, 215 and 284, reduces the current therethrough, and lowers the heat output thereof.

The circuit now is from line 200 through switches 111 and 112 to resistances 284, 215, 220 and 230 to the conductor 232 to contact stud 105, contact arm 97, conductor 206 to coil 135 to conductor 208 and to the opposite side 209 of the circuit.

The insertion of this additional resistance lowering the heat output and thus lowering the temperature should result in reduction of pressure within the pressure cooker so that the Bourdon tube 93 may contract and conductor 97 be returned to contact stud 104, at which time resistance 230 will be cut out and the heat output of heating element 30 be stepped up to proper cooking temperature.

Thus, resistances 284, 215 and 220 should be so matched that the output will result in proper cooking temperature continuously throughout the cooking cycle. Should the contents of the cooker, however, be such as to permit excessive rise in temperature and therefore of pressure, the introduction of resistance 230 lowers the output. Should this rise in temperature and therefore in pressure proceed beyond reasonable bounds, then the further expansion of Bourdon tube 93 moves the contact arm 97 further counterclockwise off the stud 105.

At this point, it will be obvious that the circuit to heating element 30 is broken. The heating element 30 is deenergized and the coil 135 is deenergized, thus opening valve 130 and permitting release of pressure to relieve the internal pressure condition within the cooker. This will immediately result in contraction of the Bourdon tube 93 until the contact arm 97 once more engages contact stud 105.

At this time, heating element 30 will be energized and the coil 135 will be energized once more. Valve 130 is thus closed and the heating element begins to operate once more to maintain pressure. Since resistances 284, 215, 220 and 230 are in series therewith, the output of the heating element 30 will be relatively low and the contact arm 97 should move back to stud 104 cutting out resistance 230 so that the output of the heating element 30 will be stepped up slightly to maintain cooking pressure.

In ordinary cases, contact arm 97 will be moved to contact stud 104 and will remain thereat with resistances 284, 215 and 220 and coil 135 in series with each other. Only in rare cases will the contact arm 97 move up to stud 105 to be in the additional resistance 230, and only in extreme cases will it be necessary for the contact arm 97 to move upwardly off the contact stud 105 and off the stud 106 to break the circuit and turn off the heating element and release steam.

Thus, this breaking of the circuit and automatic release of steam through the valve structure 130 when excess pressure is reached, is a complement to the safety feature of the escape or safety valve 120. On excess pressure, the contact arm 97 should move off the stud 106 and turn off the heat and release steam through the valve 130 before safety valve 120 operates.

Safety valve 120 will, however, operate should any of the foregoing elements fail to function for some reason, or should the nut 160 of the valve structure 130 be turned in to maintain steam.

On completion of the 25 minute cooking cycle previously assumed, the clock or time delay device 114 opens switch 112. Since this switch is in series with heating element 30 and coil 135, it de-energizes both of these units so that the heating element 30 is turned off and the solenoid armature 141 moves to the left. This opens the valve structure 130 as previously described and permits the steam in the pressure cooker to escape so that the cover 12 may be removed immediately.

Should it be necessary or desirable that the pressure cooker cool down slowly after completion of the cooking cycle, or that the steam within the pressure cooker be condensed into moisture once more within the pressure cooker at the completion of the cooking cycle, then prior to the initiation of the cooking operation the housewife should turn the nut 160 in until the ball valve 136 is locked against the valve seat 137 as previously described.

The nut 160 may be turned in at any time during the cooking cycle or just before the timing device 114 completes its pre-set cycle; although in usual cases where it is desired to prevent escape of steam and to cause a slow cooling of the pressure cooker, the nut 160 will be turned in before the cooking cycle begins.

Thus, my novel pressure cooker is entirely automatic in operation and need not be attended in any way. All of the operations preparatory to cooking may be done at any convenient time with the clocks 113 and 114 pre-set for desired intervals and the pointer 100 pre-set for the desired cooking pressure. The housewife or other user of the pressure cooker need merely place the food in the container 60, place the insert container 60 in the pressure cooker, place the drip ring 70 in position on the ledge 71 and secure the cover 12 to the pressure cooker.

The clock 113 is set for the particular time at which the cooking cycle is intended to begin. The clock 114 is set for the cooking interval. Pointer 100 is set for the cooking pressure; and then the pressure cooker need not further be attended until the time comes for removal of the cooked contents. Thus, it will be seen that all of the operations are entirely automatic and fool-proof.

It will be obvious that many modifications and variations of my invention will be apparent to those skilled in the art. Thus, the drip ring 70 may in appropriate cases be made a part of the cover structure 12 so that a separate operation with respect thereto will not be necessary.

The various elements of the automatic system may also be modified in obvious ways. Thus, any type of pressure gauge may be used which will move the contact arm 97 in response to the pressure and any type of contact arrangement may be used on the contact plate 99.

Figure 6 shows a preferred arrangement of pressure gauge 90 in greater detail than shown in Figure 3. All identical parts are numbered the same in both figures. Figure 6 shows a sectional view, greatly enlarged, as would be seen when looking in a downward direction at the pressure gauge shown in Figure 3. The gauge casing 300 has a threaded hole 301 into which is screwed threaded tube 91. The other end of tube 91 is screwed into threaded hole 92 of wall 14. Thus, tube 91 acts as a mounting for the pressure gauge 90. Bourdon tube 93 is sweat-soldered into hole 303 which has access to the interior of the pressure cooker through holes 302, 301 and tube 91. End 94 of Bourdon tube 93 actuates link 95 which in turn actuates arm 304 through pin 96. Arm 304 is fastened by pin 305 to shaft 306 which is free to rotate in bearing holes 307 in casing 300. Thus, shaft 306 is rotated by deformation of the Bourdon tube 93 caused by pressure changes within the cooker. Hubs 308 and 310 are fastened by pins 309 and 311 respectively to shaft 306. Hub 308 is made of insulating material and carries contact arm 97. Hub 310 carries pointer 312 which indicates the pressure inside the cooker against scale or dial 101 fitted into recess 313 of casing 300. Hub 314 is free to rotate on shaft 306. Gear 315 is fastened to hub 314 and meshes with pinion 316. Turning knob 318 turns pinion 316 through shaft 317 which is free to rotate in hole 319 of casing 300. This turns gear 315, adjusting the angular position of hub 314. Fastened to hub 314 is contact plate 99, made of insulating material. Contact plate 99 carries contacts 102, 103, 104, 105 and 106 which are engaged by contact arm 97. Also fastened to hub 314 is pointer 100 which indicates against dial 101 the desired pressure to which contact plate 99 has been adjusted by knob 318. Dial 101 and pointers 100 and 312 are protected by dial glass 320 which fits into recess 321 of casing 300. Glass 320 is held in place by bezel 322 which is pressed over edge 323 of casing 300. Outer casing 22 has a suitable opening 324 for the casing 300. However, it is to be noted that the gauge is not supported by wall 22 but only by tube 91 supported in turn by wall 14.

The steam release valve 130 may in certain cases be dispensed with where the pressure cooker is designed so that the steam will always be retained at the end of the cooking cycle. The utilization of the release valve structure 130, however, incorporates an additional safety feature and also provides for selective operation by the user who can determine for herself whether at the end of the automatic cooking cycle the steam should be released or retained.

My novel pressure cooker may also be arranged by placing an appropriate switch 273 between conductors 267 and 268 so that the heating element 30 may be immediately energized by manually closing switch 273. Also, in this case, by simply setting the clock 114 for a time interval much longer than the desired cooking cycle, the switch 273 may be utilized to control the entire cooking cycle manually when attended operation is desired.

Since many other variations and modifications of my invention should now be obvious to those skilled in the art, I prefer to be bound not by the specific disclosures herein contained but only by the appended claims.

I claim:

1. An automatic pressure cooker comprising a casing having bottom and side walls and an open top; a pressure tight cover for the open top; an electrical heating element supported in said casing; a control for said electrical heating element supported in said casing and accessible for adjustment from the outside of said casing, said control comprising a pressure responsive member connected to the interior of said casing and movable in response to variations in pressure within said casing, and a plurality of electrical resistance elements; means for connecting selected resistance elements in circuit with each other and with said heating element in accordance with variations in pressure within the casing; said means including a contact arm connected to and movable by said pressure responsive member; a contact carrying plate having a plurality of contact members successively engageable by said contact arm to connect successive resistances in series with said heating element; a pressure release valve in said casing; and means for biasing said valve to open position; solenoid means in circuit with said heating element for holding said valve closed; said biasing means being effective to open said valve on de-energization of said heating element and solenoid.

2. An automatic pressure cooker comprising a casing having bottom and side walls and an open top; a pressure tight cover for the open top; an electrical heating element supported in said casing; and a control for said electrical heating element supported in said casing and accessible for adjustment from the outside of said casing, said control being responsive to variations in pressure within said casing; and a pressure release valve in said casing; means for biasing said valve to open position; solenoid means energized simultaneously with said heating element for holding said valve closed; said biasing means being effective to open said valve on de-energization of said heating element and solenoid.

3. An automatic pressure cooker comprising a casing having bottom and side walls and an open top; a pressure tight cover for the open top; an electrical heating element supported in said casing; a control for said electrical heating element supported in said casing and accessible for adjustment from the outside of said casing, said control comprising a pressure responsive member connected to the interior of said casing and movable in response to variations in pressure within said casing, and a plurality of electrical resistance elements; means for connecting selected resistance elements with each other and with said heating element in accordance with variations in pressure within the casing; said means including a contact arm connected to and movable by said pressure responsive member; a contact carrying plate having a plurality of contact members successively engageable by said contact arm to connect successive resistances with said heating element; a pressure release valve in said casing; and means for biasing said valve to open position; solenoid means energized simultaneously with said heating element for holding said valve closed; said biasing means being effective to open said valve on de-energization of said heating element and solenoid; and additional means for selectively maintaining said valve closed against said biasing means irrespective of the energization and de-energization of said solenoid means.

4. A pressure cooker comprising a casing having bottom and side walls and an open top; a pressure tight cover for the open top; said casing comprising an outer shell and an inner metallic shell; means spacing the inner shell from the outer shell at the bottom and side walls; and a heat insulating filler between the outer and inner shells; an electrical heating element in the bottom wall between the outer and inner shell in heat transferring relation with the inner shell; an inner removable container for said inner shell of the casing; an annular frustro-conical drip ring for said inner shell of said casing; the upper opening of said drip ring being larger than the lower opening; means at the upper end of the inner shell of said casing above the inner container for mounting said drip ring; the lower opening of said drip ring being smaller in diameter than the diameter of the inner container; the drip ring returning moisture condensed on the interior of the cover of the casing to the inner container.

5. A pressure cooker comprising a casing having bottom and side walls and an open top; a pressure tight cover for the open top; said casing comprising an outer shell and an inner metallic shell; means spacing the inner shell from the outer shell at the bottom and side walls; and a heat insulating filler between the outer and inner shells; an electrical heating element in the bottom wall between the outer and inner shell in heat transferring relation with the inner shell; an inner removable container for said inner shell of the casing; an annular frustro-conical removable drip ring for said inner shell of said casing; the upper opening of said drip ring being larger than the lower opening; an annular ledge at the upper end of the inner shell of said casing above the inner container for mounting said drip ring; the lower opening of said drip ring being smaller in diameter than the diameter of the inner container; the drip ring returning moisture condensed on the interior of the cover of the casing to the inner container.

6. A cooking utensil comprising a casing having bottom and side walls and an open top; a cover for the open top; an inner removable container for said casing; means in the interior of the casing for spacing said inner removable container from the interior side wall of the casing; an annular frustro-conical drip ring for said interior of said casing; the upper opening of said drip ring being larger than the lower opening; means at the upper end of the interior of said casing above the inner container for mounting said drip ring; the lower opening of said drip ring being smaller in diameter than the diameter of the inner container; the drip ring returning moisture condensed on the interior of the cover of the casing to the inner container.

7. A cooking utensil comprising a casing having bottom and side walls and an open top; a cover for the open top; an inner removable container for said casing; means in the interior of the casing for spacing said inner removable container from the interior side wall of the casing; an annular frustro-conical removable drip ring for said interior of said casing; the upper opening of said drip ring being larger than the lower opening; an annular ledge at the upper end of the interior of said casing above the inner container for mounting said drip ring; the lower opening of said drip ring being smaller in diameter than the diameter of the inner container; the drip ring returning moisture condensed on the interior of the cover of the casing to the inner container.

8. An automatic pressure cooker comprising a casing having bottom and side walls and an open top; a pressure tight cover for the open top; an electrical heating element supported in said casing; and a control for said electrical heating element supported in said casing and accessible for adjustment from the outside of said casing, said control being responsive to variations in pressure within said casing, and a pressure release valve in said casing; means for biasing said valve to open position; solenoid means energized simultaneously with said heating element for holding said valve closed; said biasing means being effective to open said valve on de-energization of said heating element and solenoid; and adjustable timing means carried by said casing, said timing means being operable to connect said heating element to a source of current at a selected time, to initiate an interval timing operation when a predetermined temperature has been reached within the casing and to disconnect said heating element at the end of a selected interval.

9. An automatic pressure cooker comprising a casing having bottom and side walls and an open top; a pressure tight cover for the open top; an electrical heating element supported in said casing; and a control for said electrical heating element supported in said casing and accessible for adjustment from the outside of said casing, said control being responsive to variations in temperature within said casing, a plurality of electrical resistance elements; a contact member movable by said control member to connect said resistances successively in circuit with said heating element, and a pressure release valve in said casing; means for biasing said valve to open position; solenoid means energized simultaneously with said heating element for holding said valve closed; said biasing means being effective to open said valve on de-energization of said heating element and solenoid.

FREDERICK KORN.

REFERENCES CITED

The following references are of record in the file of this patent:

UNITED STATES PATENTS

| Number | Name | Date |
|---|---|---|
| 1,381,282 | Clark | June 14, 1921 |
| 1,391,863 | Spangler | Sept. 27, 1921 |
| 1,422,348 | Duncan | July 11, 1922 |
| 1,702,089 | Rohne | Feb. 12, 1929 |
| 1,931,190 | Goughnour | Oct. 17, 1933 |
| 1,946,220 | Lotz | Feb. 6, 1934 |
| 2,119,455 | De Ayala | May 31, 1938 |
| 2,308,603 | Graham | Jan. 19, 1943 |
| 2,369,932 | Allen | Feb. 20, 1945 |